United States Patent [19]

Pyka et al.

[11] Patent Number: 5,295,913
[45] Date of Patent: Mar. 22, 1994

[54] DEVICE FOR COUPLING A WINDING SHAFT PIN WITH A DRIVE SHAFT PIN

[75] Inventors: Udo Pyka; Horst Teepe, both of Lengerich, Fed. Rep. of Germany

[73] Assignee: Windmoeller & Hoelscher, Lengerich, Fed. Rep. of Germany

[21] Appl. No.: 977,979

[22] Filed: Nov. 18, 1992

[30] Foreign Application Priority Data

Nov. 18, 1991 [DE] Fed. Rep. of Germany ....... 4137921

[51] Int. Cl.⁵ ...................... B65H 18/06; B65H 18/10
[52] U.S. Cl. ...................................... 464/106; 464/901
[58] Field of Search ............... 464/106, 182, 185, 901; 403/220, 221, 223, 286, 341; 384/193; 242/67.1 R

[56] References Cited

U.S. PATENT DOCUMENTS

| 2,823,961 | 2/1958 | Showalter | 308/15 |
| 4,758,113 | 7/1988 | Kunz | 403/286 X |
| 4,838,725 | 6/1989 | Fazis | 464/182 X |
| 4,848,934 | 7/1989 | Blakely et al. | 384/206 |
| 4,887,926 | 12/1989 | Kunz | 403/286 X |
| 5,061,087 | 10/1991 | Roerig et al. | 384/192 |
| 5,069,394 | 12/1991 | Pamttila et al. | 242/67.1 R |
| 5,137,495 | 8/1992 | Luebke | 464/182 X |

FOREIGN PATENT DOCUMENTS

| 1774566 | 10/1971 | Fed. Rep. of Germany. |
| 2932895 | 3/1981 | Fed. Rep. of Germany. |
| 1434165 | 10/1988 | U.S.S.R. ............... 464/152 |

*Primary Examiner*—Clifford D. Crowder
*Assistant Examiner*—John J. Calvert
*Attorney, Agent, or Firm*—Keck, Mahin & Cate

[57] ABSTRACT

In a device for coupling a winding shaft pin with a drive shaft pin, the latter is provided with a radial recess, in which the winding shaft pin is held by a latching means in such a manner as to prevent relative rotation. In order to ensure centered running of the winding shaft pin even after prolonged use a self-aligning bearing (4) is mounted on the winding shaft pin, whose outer ring and is adapted to pivot about a transverse axis in relation to the inner ring and is able to be held and latched in the radial recess (14). The winding shaft pin (3) is connected with the drive shaft pin (12) at the end for transmission of the torque.

10 Claims, 2 Drawing Sheets

DEVICE FOR COUPLING A WINDING SHAFT PIN WITH A DRIVE SHAFT PIN

FIELD OF THE INVENTION

The present invention relates to a device for coupling a winding shaft pin with a drive shaft pin, which is provided with a radial recess, in which the winding shaft pin is held in such a manner as to prevent relative rotation.

BACKGROUND OF THE INVENTION

In the case of a known device in accordance with the German patent 2,932,895, of this type the winding shaft pin is provided with lateral flats which are parallel to each other or with a terminal member which is triangular or square in cross section, which are held in recess, the recess assuming a form, which is complementary to the end provided with the flats, of the winding shaft or the terminal member after fastening the locking device. Owing to bending of the winding shaft and to other unavoidable relative movements of the terminal member provided with flats, of the winding shaft pin or of the terminal member there is wear in the recess constituting the one half of the coupling, in the drive shaft pin, rendering a replacement of parts of the coupling necessary. In order to increase its length of life, there is consequently a provision in the case of the known device for the coupling parts of the drive shaft pin to be provided with a lining for the recess, which may be replaced after wear has occurred without the entire drive shaft pin provided with the coupling part having to be replaced. Owing to the unavoidable wear a certain degree of play does however occur in the known coupling device between the terminal or end part provided with the flats, of the winding shaft pin or the terminal member and the retaining lining of the drive shaft pin, such play then impairing centering of the bearing effect and, in connection with it, true running on center of the winding shaft. However, true, centered running is absolutely essential for a satisfactory winding action and in order to maintain a completely regular tension in the web during the winding operation.

SUMMARY OF THE INVENTION

Accordingly one object of the invention is to so improve the known coupling device that even after a long period of use a centered bearing system of the winding shaft pin is ensured.

In the case of a coupling device of the type initially mentioned this object is to be attained in the invention by the provision of a self-aligning bearing on the winding shaft pin, whose outer ring is adapted to pivot about a transverse axis in relation to the inner ring and is able to be held and latched in the radial recess and the winding shaft pin is connected with the drive shaft pin at the end for transmission of the torque.

In the case of the coupling device in accordance with the invention the functions of bearing and transmission of the torque between the shaft pins coupled with each other are kept separate from each other so that on the one hand there is a satisfactory centered bearing system and on the other hand there is a satisfactory transmission of torque without the two functions interfering with each other. Since the winding shaft pin is held in the drive shaft pin by a self-aligning bearing, low-wear performance of the bearing is ensured for a long time even when there is substantial bending of the winding shaft. Since the self-aligning bearing only serves for centered bearing of the winding shaft pin and not for transmission of torque as well, the bearing system is not subject to the otherwise unavoidable, substantial wear owing to transmission of torque. In the case of the coupling device in accordance with the invention the transmission of the torque takes place owing to end-on connection of the winding shaft pin with the drive shaft pin so that this coupling for the transmission of torque is not able to interfere with true, on-center running of the winding shaft even after the occurrence of wear between the parts responsible for the coupling of torque.

In accordance with an advantageous development of the invention there is the provision of a self-aligning bearing such that it consists of an inner ring with a spherical outer surface and an outer ring held on the latter, inner shell which has corresponding complementary inner shell. The self-aligning bearing is able to take up or allow for bending of the winding shaft without this leading to deformation causing wear.

It is convenient if the end face of the winding shaft pin is screwed to a coupling member, which is interlockingly held in the radial recess in the drive shaft pin. This interlocking rotation-transmitting connection between the pins means that there is an advantageous transmission of torque.

The coupling member may consist of a triangular disk which on two sides is held on the flanks of a holding jaw. The holding jaws preferably consist of segments, which are connected with the wall surfaces of a semi-cylindrical shell of the radial recess by screws or the like so that the latter may be replaced after wear has taken place. Preferably the coupling member is screwed to the end of the winding shaft pin using a washer, such washer bearing with a loading effect on the inner ring of the winding shaft pin. In this respect it is possible for the inner ring to be urged against an annular shoulder on the shaft pin so that additionally there is also a frictional or non-positive transmission of torque.

In accordance with a further possible development of the invention the self-aligning bearing is held in place by an axially sliding holding ring in the recess, which is able to be moved between its latched position and a position in which it is released. The holding ring latches the self-aligning bearing in the semi-cylindrical shell, which constitutes the floor of the radial recess of the drive shaft pin.

A further expedient feature of the invention is such that the holding ring is provided with a segment fitting into the recess and which is provided with an inner wall surface having the configuration of a cylindrical shell, such wall completing the semi-cylindrical shell as a complete cylindrical section, in which the self-aligning bearing is held. In this respect, the axis of this complete cylindrical section is naturally aligned with the axis of the winding shaft.

It is convenient, furthermore, for the holding ring to be held by a pin in an axially extending slot in the drive shaft pin for sliding between its latching position and its release setting. In this manner the terminal positions of the holding ring are exactly defined and secured.

In order to prevent undesired movement of the holding ring into its release setting, in accordance with a further development of the invention the holding ring is secured in its latched position by a spring-loaded latch.

BRIEF DESCRIPTION OF THE FIGURES

One working embodiment of the invention will now be described in following with reference to the drawing.

DETAILED DESCRIPTION OF THE PREFERRED EMBODIMENT

Figure 1:
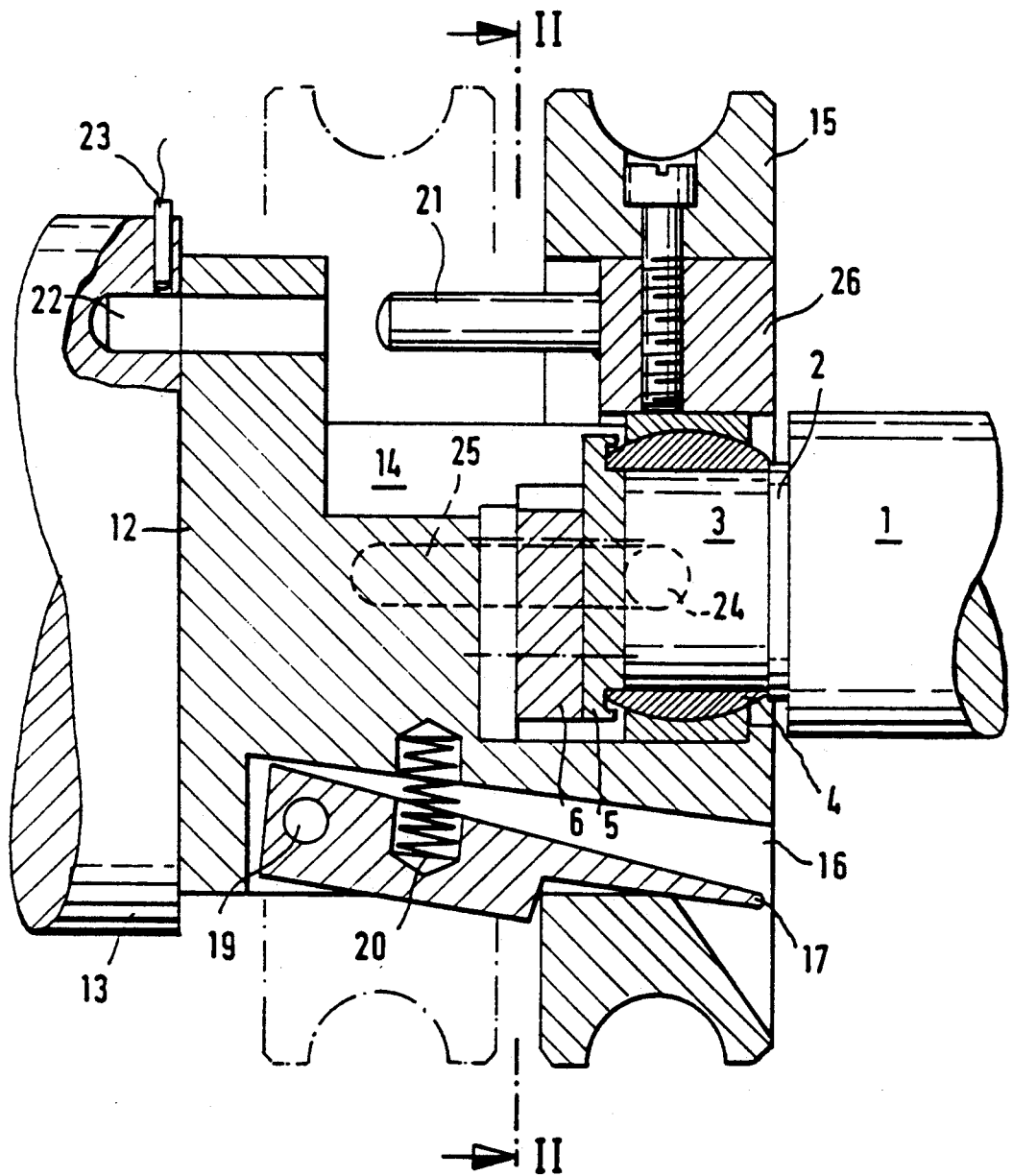
FIG. 1 shows a longitudinal section taken through winding shaft and drive shaft pins as coupled with each other.
Figure 2:
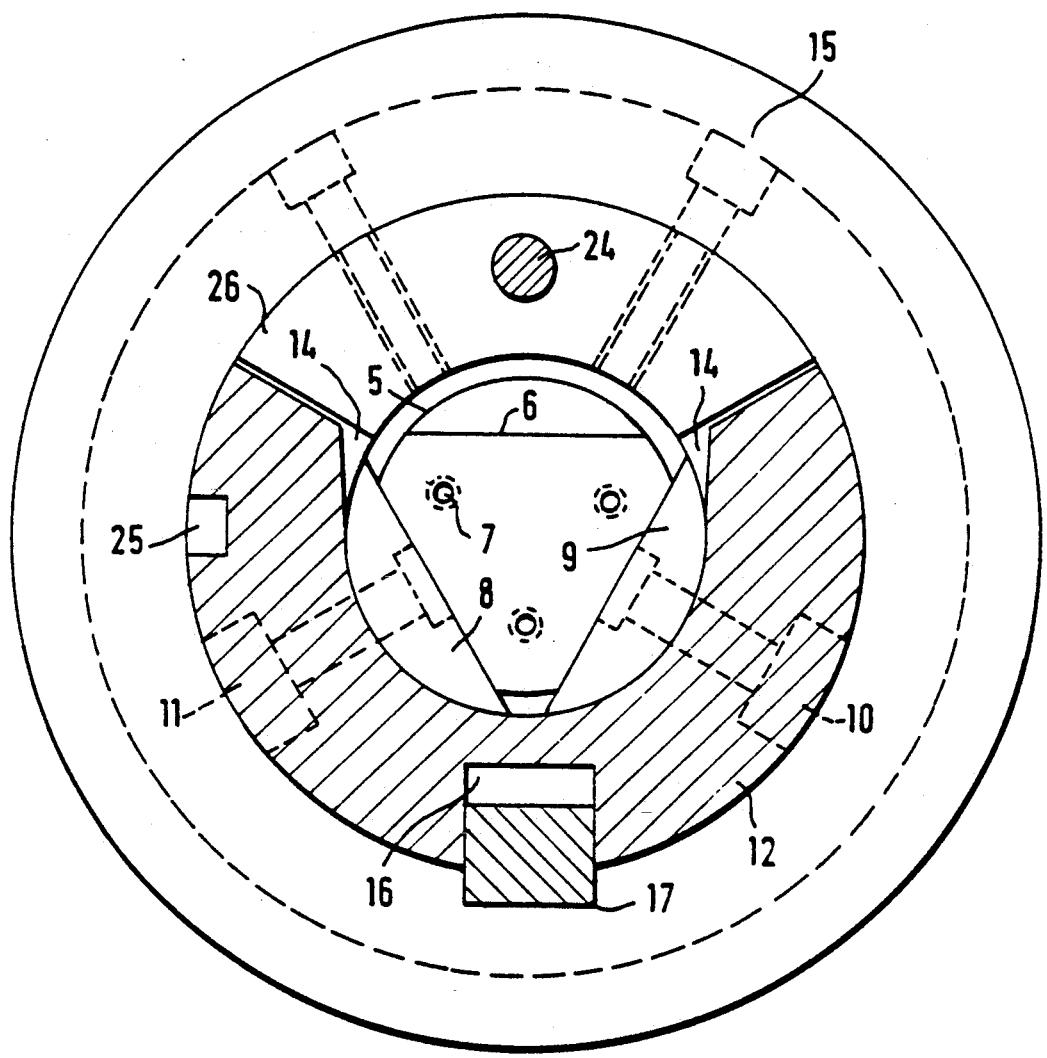
FIG. 2 is a section taken through the coupling device on the line II—II of FIG. 1.

The left hand end of the winding shaft 1 is provided with a head 2 reducing its diameter and with a winding shaft pin 3 which is set back in relation to it. A self-aligning bearing 4 is mounted on the winding shaft pin 3 so that at one end its bears on the head 2. Self-aligning bearing (4) has an inner ring (4A) with a spherical outer surface and an outer ring (4B) having a spherical surface which engages the spherical outer surface of inner ring (4A). The other end of the self-aligning bearing 4 is secured in place by an entraining disk 5, against which, on the side facing away from the shaft pin 3, a coupling member 6 rests. The coupling member 6 and the entraining disk 5 are connected by means of screws 7 with the shaft pin 3 permanently. As shown in FIG. 2 in this respect the coupling member 6 has a form which is generally triangular in cross section. Two sides of the coupling member 6 are in engagement with segments 8 and 9, which are connected by the intermediary of screws 10 and 11 with the drive pin 12 of a drive shaft 13. With reference to FIG. 1 it will be seen that drive pin 12 is partly milled out in the upper part so that the winding shaft 1 may be laid in the milled recess from above, the coupling member 6 resting, as shown in FIG. 2, on the one hand on the segments 8 and 9 and on the other hand the outer ring of the self-aligning bearing 4 also being supported in this drive pin 12. However, in order to be able to place the winding shaft in the recess 14 in the drive pin 12 at all it is necessary for the annular disk 15 to be shifted from the position shown in full lines in FIG. 1 into the position shown in dash-dotted lines. For this purpose there is a groove 16 extending in the axial direction in the drive pin 12 and in the groove there is a latch 17 able to pivot about the axis 19 of rocking. This latch 17 is held by a spring 20 in the locking position illustrated in FIG. 1. By depressing this latch 17 the annular disk 15 is released so that it can be moved to the left into the position shown in dash-dotted lines. In this position the securing pin 21, which is permanently connected with the disk 15, will fit into a blind hole 22 so that it is possible to ascertain by means of a sensor 23 whether the annular disk 15 is in fact in its terminal position. Using the sensor or microswitch it is then possible to prevent any chance of the motor unintentionally being switched on to turn the drive shaft 13.

The two terminal positions of the annular disk 15 are predetermined and held by a pin 124 connected with it, which extends into a longitudinal groove 25, which is provided in the drive pin 12. After insertion of a new winding shaft the annular disk 15 moved back into the position indicted in full lines in FIG. 1 and held in such position by the latch 17. A segment 26 screwed to the annular disk 15 then slides onto the outer bearing shell of the self-aligning bearing 4 so that the same is held circumferentially on the one hand by the drive pin 12 and on the other hand by the segment 26.

The driving force is now transmitted to the winding shaft from the drive shaft 13 via the drive pin 12 to the segments 8 and 9 and via the same to the coupling member 6, and thence via the entraining disk 5 or, respectively, the screws 7 to the shaft pin 3 of the winding shaft 1. Therefore there are no driving forces present adjacent to the bearing of the winding shaft 1 through the self-aligning bearing 4 and which might cause wear here. The unavoidable, slight bending of the winding shaft during the winding operation is allowed for by the self-aligning bearing 4. Even if, when after a long period of use wear should occur at the coupling member 6 and at the segments 8 and 9, this wear would be completely independent of the actual bearing means of the winding shaft 1.

What is claimed is:

1. A device for coupling a winding shaft pin with a drive shaft pin, said drive shaft pin being provided with a radial recess, said winding shaft pin being held by a latching means in said radical recess to prevent relative rotation, characterized in that:
    a self-aligning bearing (4) is provided on the winding shaft pin (3), an outer ring (4B) of said self-aligning bearing (4) pivotable about a transverse axis in relation to an inner ring (4A) of said self-aligning bearing (4) said inner ring possible and latchable in the radial recess (14), and
    the winding shaft pin (3) being connected with the drive shaft pin (12) at one end thereof for torque transmission, independently of the bearing function provided by the self-aligning bearing.

2. The device as claimed in claim 1, characterized in that the self-aligning bearing (4) comprises an inner ring with a spherical outer surface an outer ring with a corresponding complementary inner surface.

3. The device as claimed in claim 1, characterized in that an end face of the winding shaft pin (3) is screwed against a coupling member (6), which coupling member (6) is interlocked and held in the radial recess (14) in the drive shaft pin (12).

4. The device as claimed in claim 3, characterized in that the coupling member comprises a triangular disk (6), which is held on two sides against flanks of holding jaws (8 and 9).

5. The device as claimed in claim 4, characterized in that the holding jaws consist of segments (8 and 9) which are connected with wall surfaces of a semi-cylindrical shell of the radial recess (14) by screws (7).

6. The device as claimed in claim 3, characterized in that the coupling member (6) is screwed to the end of the winding shaft pin (3), a disk (5) being interposed between the end of the winding shaft pin (3) and the coupling member (6), said winding shaft pin (3) bearing with a loading effect on the inner ring of the self-aligning bearing (4).

7. The device as claimed in claim 1, characterized in that the self-aligning bearing (4) is held by an axially sliding holding ring (15) in the recess (14), which is able to be moved between a locking position and a release position.

8. The device as claimed in claim 7, characterized in that the holding ring (15) is provided with a segment (26) fitting into the recess and is provided with an internal wall surface having the form of a cylindrical shell, which wall surface complements a semi-cylindrical shell-like floor of the recess (14) to constitute a complete cylindrical section in which the self-aligning bearing is held.

9. The device as claimed in claim 7, characterized in that the holding ring (15) is held by a pin (24) in an axially extending slot (25) in the drive shaft pin (12) for sliding between the locking position of the holding ring and the release setting of the holding ring.

10. The device as claimed in claim 7, characterized in that the holding ring (15) is secured in the locking position by a spring-loaded latch (17).

* * * * *